United States Patent

Wegmann et al.

Patent Number: 5,108,841
Date of Patent: *Apr. 28, 1992

[54] ELECTROACTIVE ULTRA-THIN LAYERS

[75] Inventors: Alex Wegmann, Allschwil; Bernd Tieke, Marly; Carl W. Mayer, Riehen; Bruno Hilti, Basle; Walter Fischer, Reinach, all of Switzerland; Wolfgang Wernet, Freiburg, Fed. Rep. of Germany

[73] Assignee: Ciba-Geigy Corporation, Ardsley, N.Y.

[*] Notice: The portion of the term of this patent subsequent to Apr. 23, 2008 has been disclaimed.

[21] Appl. No.: 355,219

[22] Filed: May 22, 1989

[30] Foreign Application Priority Data

May 27, 1989 [CH] Switzerland ............... 2008/88-0

[51] Int. Cl.$^5$ .................. B32B 9/04; H01B 1/00
[52] U.S. Cl. .................. 428/411.1; 252/500; 252/518
[58] Field of Search ............ 252/500, 518; 428/411.1; 568/326; 570/129, 143

[56] References Cited

U.S. PATENT DOCUMENTS

| | | |
|---|---|---|
| 4,522,754 | 6/1985 | Hilti et al. |
| 4,601,853 | 7/1986 | Hilti et al. |
| 4,617,151 | 10/1986 | Mayer et al. |
| 4,803,011 | 2/1989 | Barraud et al. |
| 5,009,812 | 4/1991 | Finter et al. |

OTHER PUBLICATIONS

Angew. Chemie, 98, 1114–5 (1986).
Synth. Met., 16, 17–30 (1986).
Langmuir, 2, 513–9 (1986).
Accounts of Chem. Research, 12(3), 79–86 (1979).

Primary Examiner—Josephine Barr
Attorney, Agent, or Firm—Kevin T. Mansfield; Edward McC. Roberts

[57] ABSTRACT

Monolayer or multilayer systems containing compounds of the formula I

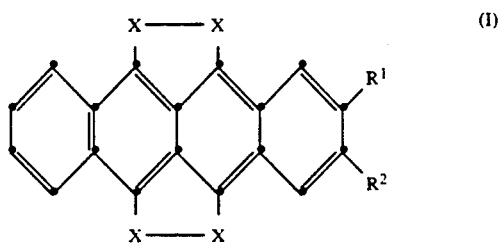

in which X is S or Se, $R^1$ is $C_1$–$C_{30}$alkyl, —$CF_3$, —O—$R^3$, —S—$R^3$ or —CO—O—$R^3$, $R^2$ is hydrogen, $C_1$–$C_{30}$alkyl, —$CF_3$, —O—$R^3$ or —CO—O—$R^3$, and $R^3$ is $C_1$–$C_{30}$alkyl or partially or perfluorinated $C_1$–$C_{30}$alkyl, are described.

Electrically conductive layers which are suitable, for example, for the production of electrically conductive coatings can be prepared from the layer systems by doping with electron acceptors.

8 Claims, No Drawings

ELECTROACTIVE ULTRA-THIN LAYERS

The present invention relates to monolayers or multilayers of tetrathiotetracene derivatives (TTT derivatives) or tetraselenotetracene derivatives (TSeT derivatives), selected processes for their preparation, and also the use of the layer systems for the production of electronic components, as electrodes or as sensors.

2-Fluoro-TSeT is known from EP-A-109,360 and -153,905. This compound can be used to produce bromine or chlorine complexes which exhibit metallic conductivity at low temperatures.

2-Carboxylic acid esters or 2,3-dicarboxylic acid esters of TTT or of TSeT are known from DE-A-3,510,092. The compounds can be incorporated into polymers via functional radicals. Furthermore, electrically conductive charge-transfer complexes can be produced from these derivatives or from the polymers containing these derivatives by doping with electron acceptors. The polymers containing these complexes are remarkable for a good photoconductivity.

It is known from Angew. Chem., 98, 1114 (1986) that electroactive monolayer or multilayer systems can be built up from certain phthalocyanine derivatives by the Langmuir-Blodgett process (LB process).

Electrically conductive Lb multilayers composed of iodine-doped α-quinquethiophene mixed with Cd stearate are described in Synth. Met., 16, 17 (1986).

It is known from Langmuir, 2, 513 (1986) that iodine-doped LB multilayers composed of tetrakis(cumylphenoxy)phthalocyanines are electrically conductive.

It has now been found that TTT or TSeT derivatives form monomolecular layers, that these layers can be transfered to solid carriers by the LB process and that these layer systems are electrically conductive in the doped state.

Furthermore, preparation methods have been found for doped LB systems, in which the doping is carried out in the monomolecular layer and the LB system is built up only after that, or in which the doping of the monolayer or multilayer is carried out by contact with an aqueous dopant.

The present invention relates to monolayer or multilayer systems containing compounds of the formula I:

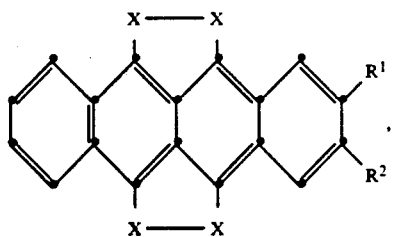

(I)

in which X is S or Se, $R^1$ is $C_1$-$C_{30}$alkyl, $-CF_3$, $-O-R^3$, $-S-R^3$ or $-CO-O-R^3$, $R^2$ is hydrogen, $C_1$-$C_{30}$alkyl, $-CF_3$, $-O-R^3$, $-S-R^3$ or $-CO-O-R^3$, and $R^3$ is $C_1$-$C_{30}$alkyl or partially or perfluorinated $C_1$-$C_{30}$alkyl.

The term "monolayer or multilayer system" is to be understood quite generally as meaning any arrangement which contains the compounds of the formula I in the form of a thin layer or a sequence of thin layers. Within the scope of this description, "thin layer" is to be understood as meaning a layer which has the thickness of one or a few molecular layers.

Such layer systems may, for example, be so-called "Cast Bilayer" films containing compounds of the formula I. This technique is described, for example, by T. Kunitake et al. in Thin Solid Films, 121, 189–91 (1984) and by M. Shimomura et al. in Ber. Bunsenges. Phys. Chem., 87, 1134–43 (1983).

Preferably, such monolayer or multilayer systems are a monomolecular layer or sequences of monomolecular layers containing compounds of the formula I which can be obtained by transfer to solid carriers by the Langmuir-Blodgett process (LB process).

If any radicals are alkyl, they may be straight-chain or branched radicals. Straight-chain radicals are preferred. Furthermore, the alkyl radicals may contain one or more trans-double bonds or triple bonds which are not in the 1-position. A multiplicity of trans-double bonds or triple bonds may be isolated or conjugated with each other. Specific examples of alkyl radicals are methyl, ethyl, n-propyl, isopropyl, n-butyl, isobutyl, n-pentyl, n-hexyl, n-heptyl, n-octyl, 2-ethylhexyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, n-tetracosyl, n-hexacosyl, n-octacosyl and n-triacontyl, or allyl, propargyl, octadec-9-trans-enyl or pentacosa-10,12-diynyl.

The perfluoroalkyl radicals preferably have 1–12 C atoms.

Some of the compounds of the formula I are known. Thus, the compounds of the formula I in which X is S or Se, $R^1$ is $-CO-O-R^3$, $R^2$ is hydrogen or $-CO-O-R^3$ and $R^3$ has the above defined meaning, can be prepared by analogy with the process described in DE-A-3,510,092.

The compounds of the formula I in which X is S, $R^1$ is alkyl, $-CF_3$, $-O-R^3$ or $-S-R^3$, and $R^2$ is hydrogen, alkyl, $-CF_3$, $-O-R^3$ or $-S-R^3$ can be obtained by the following scheme:

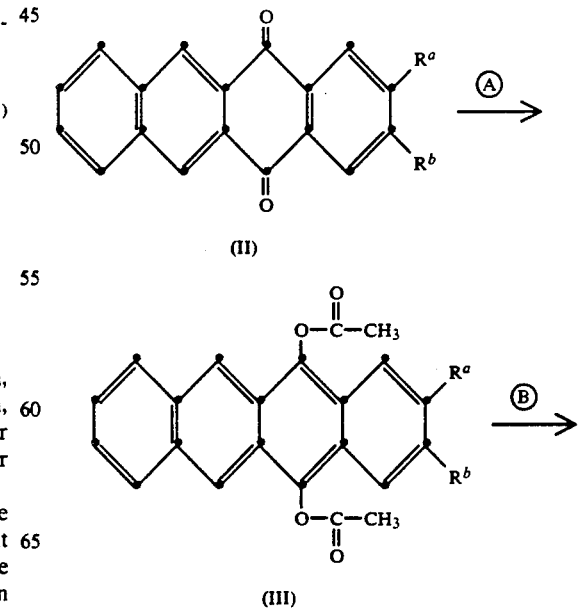

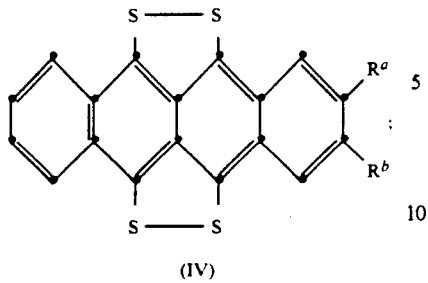

(IV)

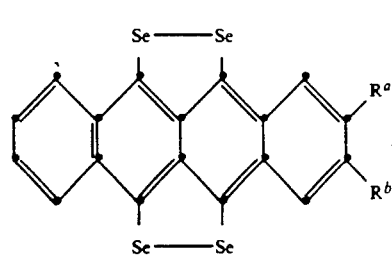

VII in which $R^a$ is alkyl, —$CF_3$, —O—$R^3$ or —S—$R^3$ and $R^b$ is hydrogen, alkyl, —$CF_3$, —O—$R^3$ or —S—$R^3$.

The reductive acylation (A) of the tetracenequinone II is in this case carried out, for example, by reaction with Zn dust in the presence of acetic anhydride, potassium acetate and a polar aprotic solvent such as ethyl acetate. In reaction (A), the reducing agent is taken, as a rule, in slight stoichiometric excess, for example in quantities of 2-4 mole, based on one mole of II.

The reaction of the bis-acetoxy compound III to produce the corresponding TTT derivative IV (reaction (B)) is expediently carried out by heating the compound III with sulfur in the presence of an acid catalyst such as an aromatic sulfonic acid, for example p-toluenesulfonic acid. The reaction is generally carried out in an inert organic solvent for the compound III. Examples thereof are halogenated aromatic hydrocarbons such as dichlorobenzene or trichlorobenzene. In reaction (B), the sulfur is generally taken in excess and the reaction is preferably carried out under reflux of the respective solvent.

The compounds of the formula I in which X is Se and $R^1$ and $R^2$ have the meanings defined above for $R^a$ and $R^b$ respectively, can be obtained by the following scheme:

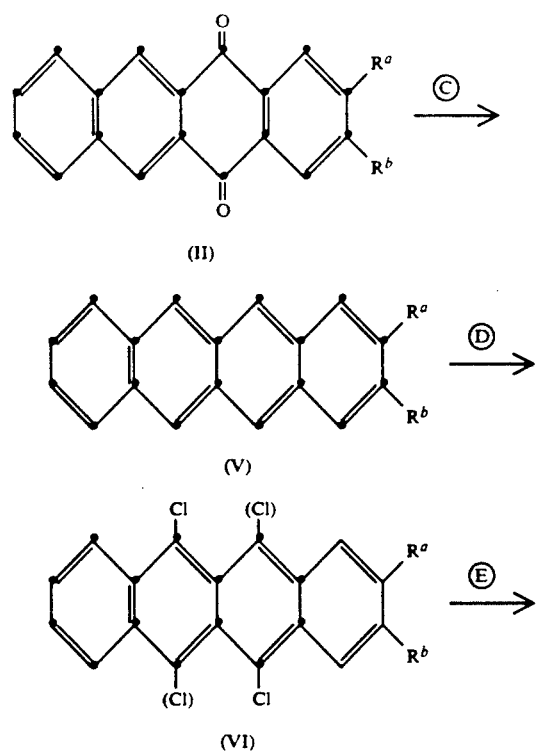

The reduction of the tetracenequinone II to the corresponding tetracene V (reaction (C)) can be carried out in a manner known per se by reacting the compound II with an excess of a reducing agent, for example Zn dust. The reaction is preferably carried out in a mixture of glacial acetic acid and potassium acetate.

The reaction of the tetracene derivative V to produce the corresponding dichloro- or tetrachlorotetracene VI can be carried out in a manner known per se by reacting the compound V with sulfuryl chloride. Examples of such reactions on analogous compounds are found in EP-A-109,360.

The reaction of the compound VI to produce the TSeT derivative VII can also be carried out by analogy with known processes. For this purpose, the compound of formula VI is heated in the presence of selenium. Examples of such reactions are also to be found in EP-A-109,360.

The compounds of the formula IIa

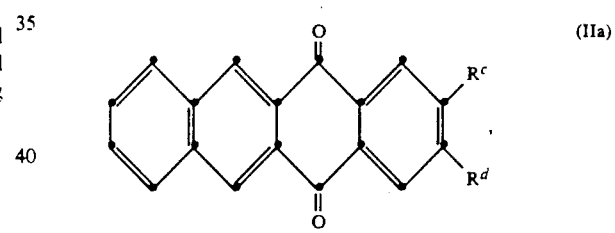

in which $R^c$ is —O—$R^3$ or —S—$R^3$, $R^d$ has one of the meanings defined for $R^c$ or is hydrogen and $R^3$ has the above defined meaning, can be obtained from 2-fluoro- or 2,3-difluorotetracene-5,12-dione by reaction with $R^3$—OH or $R^3$—SH in the presence of potassium carbonate. The reaction is in general carried out in a polar aprotic solvent, for example in dimethyl sulfoxide. The starting material 2-fluorotetracene-5,12-dione is known from EP-A-153,905. The 2,3-difluoro derivative can be produced by analogy with the 2-fluoro derivative by using 1,2-difluorobenzene instead of fluorobenzene.

The compounds of the formula IIb

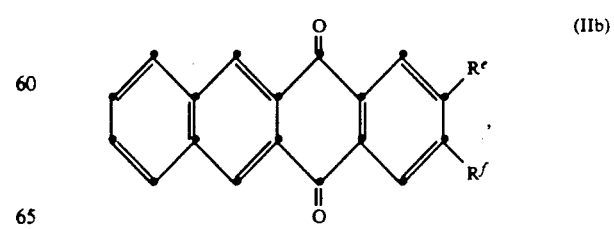

in which $R^e$ is alkyl and $R^f$ is hydrogen or alkyl, can be obtained by Friedel-Crafts acylation of alkyl- or 1,2- dialkylbenzenes with naphthalene-2,3-dicarboxylic anhydride and subsequent cyclization.

Examples of an analogous reaction sequence in which fluorobenzene is used instead of alkylbenzenes are found in EP-A-109,360.

The compounds of the formula IIc in which $R^g$ is hydrogen, alkyl or $-CF_3$, can be obtained by reacting 1,2-dibromobenzocyclobutene VIII with the correspondingly substituted 1,4-naphthoquinone IX according to the following scheme:

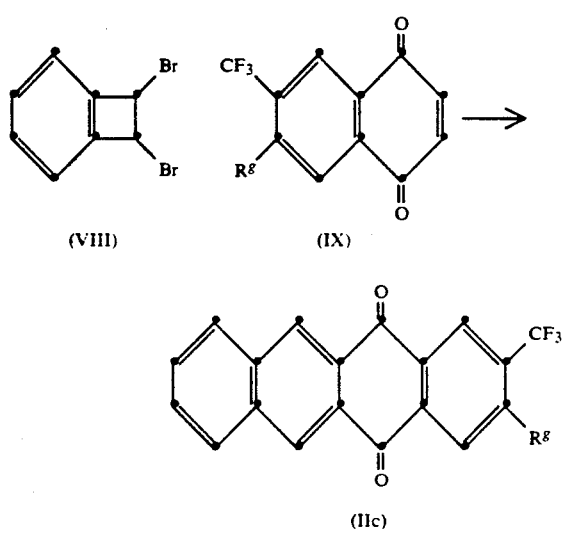

These reactions are known per se from Ann. Quim. Ser. C, 81(2), 133-8 (1985). The preparation of compound VIII is also described therein.

The compounds of the formula IX can be obtained by Diels-Alder reaction of 1,4-benzoquinone with α-pyrones of the formula X

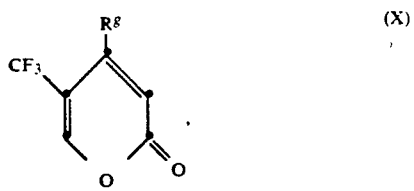

where $R^g$ has the above defined meaning.

The compounds of the formula X in which $R^g$ is hydrogen or $-CF_3$ can be prepared in a manner known per se by reacting known α-pyrone-5-carboxylic acids or α-pyrone-4,5-dicarboxylic acid diesters with $SF_4/HF$. The α-pyrone starting materials are described, for example, in U.S. Pat. No. 4,617,151.

The compounds of the formula X in which $R^g$ is alkyl can be obtained analogously to the process described in U.S. Pat. No. 4,617,151 by cyclization of compounds of the formula XI in the presence of strong, anhydrous acids, preferably anhydrous formic acid, and subsequent conversion of the $-COOR^4$ group into $-CF_3$ using $SF_4/HF$

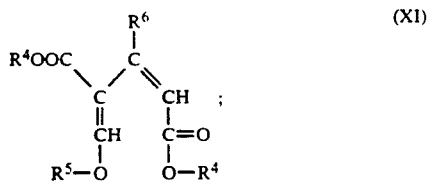

in which $R^4$, $R^5$ and $R^6$ are alkyl radicals.

The compounds of the formula XI can be obtained analogously to the process known from U.S. Pat. No. 4,617,151 by reaction of formic acid esters $HCOOR^5$ in the presence of $TiCl_4$ with compounds of the formula XII

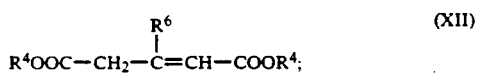

in which $R^4$ and $R^6$ have the above defined meaning.

The compounds of the formula XII can be prepared starting from the ketodicarboxylic acid esters of the formula XIIa which are known per se

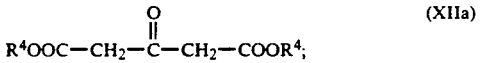

in which $R^4$ has the above defined meaning.

To this end, a compound of the formula XIIa is reacted with a chlorinating agent, for example with $PCl_3$, $PCl_5$ or $SOCl_2$, to form the corresponding dialkyl 2-chloroprop-1-ene-1,3-dicarboxylate, and the latter is dehydrohalogenated in a manner known per se to form the corresponding dialkyl allene-1,3-dicarboxylate.

This allene compound is subsequently reacted with a reagent $R^6M$ in which M is an alkali metal, for example Li, Na or K, and $R^6$ is an alkyl radical, in an inert solvent in the presence of a copper(I) compound, for example CuCN or CuCl, and then converted by hydrolysis into a compound of the formula XII. The reaction temperature is expediently $-100°$ to $-20°$ C.

These reactions are preferably carried out in an organic, inert and polar solvent, for example in ethers, such as tetrahydrofuran, sulfoxides, such as dimethyl sulfoxide, sulfones, such as tetramethylene sulfone, N-substituted carboxamides or lactams, such as dimethylformamide or N-methylpyrrolidone.

Surprisingly, stable monomolecular layers can be prepared at the water/air interface from the compounds of the formula I. To this end, a small amount of a solution of a compound of the formula I in a preferably low-boiling and water-immiscible solvent is applied in a manner known per se to a water surface, the solvent is allowed to evaporate, and the resultant film is compressed so that a stable monomolecular layer is produced on the water surface.

The subphase on which the monomolecular layer is formed generally comprises multidistilled or demineralized and filtered water to which small amounts of salts, for example $CdCl_2$ or $BaCl_2$, have, if appropriate, been added in order to stabilize the films. Furthermore, the subphase may contain buffer substances, for example $NaHCO_3$. These modifications are known to the person skilled in the art and are chosen depending on the nature of the film-forming substances.

The stability of the films can be influenced, as is known, through the choice of the experimental parameters. Thus, for example, relatively labile films of compounds of the formula I can be stabilized by cooling the subphase, or compounds of the formula I are used in combination with other suitable amphiphilic compounds which are capable of stabilizing monomolecular films. Examples of such compounds are long-chain carboxylic acids, such as palmitic acid, stearic acid, arachidic acid or behenic acid, or the esters thereof, in particular the methyl esters of these acids; long-chain primary amines, such as n-hexadecylamine, n-octadecylamine or n-eicosylamine; long-chain alcohols, such as n-hexadecanol, n-octadecanol or n-eicosanol; long-chain aliphatic hydrocarbons, such as hexadecane, octadecane or eicosane; substituted tetracene derivatives, such as 2-$C_1$-$C_{18}$alkoxytetracene, 2-$C_1$-$C_{18}$alkoxytetracene-5,12-dione, 2-$C_1$-$C_{18}$alkoxy-5,12-bis(acetoxy)tetracene or the corresponding 2,3-bis-alkoxy derivatives; or steroides and steroid derivatives, such as cholesterol; besides saturated derivatives, ethylenically or acetylenically unsaturated derivatives can also be employed. Examples of these are ω-tricosenic acid, the esters thereof, and amines or alcohols derived therefrom. The acids are preferably employed in the form of salts, in particular Cd salts.

The compounds of the formula I are generally contained in such mixtures to at least 1% by weight, based on the total mixture.

Systems containing compounds of the formula I in which X is S are preferred. Particularly preferred systems are those containing compounds of the formula I in which X is S, $R^1$ is —O—$R^3$ and $R^2$ is hydrogen. Likewise preferred systems are those containing compounds of the formula I in which X is S, $R^1$ is $CF_3$ and $R^2$ is hydrogen. $R^3$ is preferably $C_3$-$C_{18}$alkyl and in particular n-octyl.

Monomolecular films containing compounds of the formula I and, if appropriate, further suitable amphiphilic compounds can, surprisingly, be readily transferred from the water surface to solid carriers by the LB process. To this end, a solid carrier is dipped in a manner known per se through a compressed, monomolecular film on a water surface, and the said film is thereby transferred onto the carrier.

Such films preferably contain 1-95 mol-%, in particular 20-75 mol-%, of compounds of the formula I in combination with further amphiphilic compounds which are capable of stabilization of monomolecular films.

Multilayer systems can be prepared in this way by repeated dipping in and removal.

LB monolayer or multilayer systems made from such mixed films are preferred.

The layer on the water surface can be replaced after each dipping operation so that different sequences of layers on the carrier can be prepared.

The procedures for the preparation of multilayers are known per se to a person skilled in the art in the area of LB systems and are described, for example in "Techniques of Chemistry, Physical Methods of Chemistry, Vol. I, Part 3B, pp. 666-671; editor: A. Weissberger, P. Rossiter".

Suitable solid carriers for the LB process are a very wide variety of hydrophilic or hydrophobic substrates having a microscopically planar surface. Examples of these are metals, such as aluminium, copper, silver or gold, semiconductors, such as germanium, silicon or GaAs, inorganic materials, such as glass, quartz, ZnSe or $Si_2N_3$, or plastics, such as Teflon®, polyethylene, polymethyl methacrylate, polystyrene or polyester. Carriers which have been rendered hydrophobic can also be used, for example glass or quartz which has been pre-treated with trichloromethylsilane, dichlorodimethylsilane or trichlorooctadecylsilane or pre-coated with some Cd arachidate layers.

The preparation of the monolayer or multilayer systems thus essentially involves the steps i) preparation of a monomolecular layer from a compound of the formula I or from a mixture of a compound of the formula I in combination with further amphiphilic compounds which are capable of stabilization of such layers, and ii) transfer of this layer onto a solid carrier by the Langmuir-Blodgett process by dipping and/or removal of said carrier once or several times through the layer.

Such monolayers of the compound of the formula I can be transferred successively by the LB process. These layers can follow one another directly or they are alternating layers of different layer-forming materials.

Mixed layers of compounds of the formula I and salts of long-chain saturated carboxylic acids, in particular salts of straight-chain $C_{18}$-$C_{20}$ acids, salts of long-chain unsaturated acids, for example ω-tricosenoic acid or pentacosa-10,12-diynoic acid, methyl esters of these acids, in particular of long-chain saturated carboxylic acids, or substituted tetracenequinones or the bisacetoxy derivatives thereof, preferably the compounds of the formula XIII or XIV

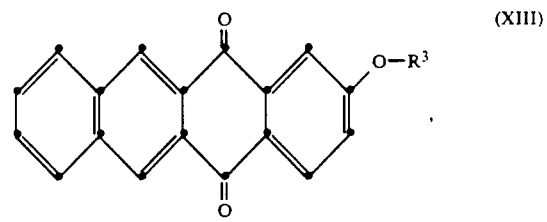

(XIII)

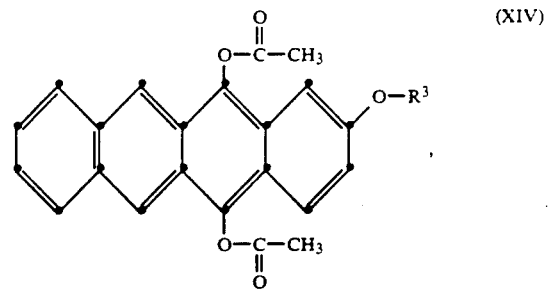

(XIV)

in which $R^3$ has the above defined meaning, are preferably transferred.

Monomolecular layers which are stable per se can also be prepared from the compounds of the formulae XIII and XIV and transferred onto solid carriers by the LB process.

Donor-acceptor complexes which have a high electrical conductivity can be prepared using the compounds of the formula I by treatment with suitable electron acceptors. The donor-acceptor complexes can, if appropriate, be radical ion salts in which complete charge transfer has taken place.

Within the scope of this description, suitable electron acceptors are to be understood as meaning compounds which, due to their oxidation potential, are capable of oxidizing the donor.

Suitable electron acceptors are halogens, such as iodine, bromine or chlorine; polybromides or polyiodides; nitrogen oxides; or organic acceptors, such as tetracyanoethylene, tetracyanoquinodimethane or chloranil. Halogens, in particular iodine, are preferably used.

The treatment (doping) of the monolayer or multilayer system of the compounds of the formula I can be carried out by direct contact of the layer system with an electron acceptor, for example by doping a layer system with iodine vapour.

The doping of the monolayer or multilayer system of the compounds of the formula I can furthermore be carried out by direct contact with an aqueous solution containing an electron acceptor. In this case, the dopant in aqueous solution surprisingly penetrates into the layer system without destroying it and causes an increase in the electrical conductivity.

The invention therefore also relates to a process for the preparation of electrically conductive monolayer or multilayer systems which comprises the above defined steps i) and ii) and also iii) bringing the monolayer or multilayer system formed into contact with an aqueous solution containing an electron acceptor for the compound of the formula I which causes oxidation of the said compound.

Furthermore, a monolayer which has already been doped on the water surface can also be transferred successively onto a carrier. The doping of the monolayer is generally carried out by addition of the dopant to the subphase. In this case, a donor-acceptor complex of the compounds of the formula I and the dopant forms at the water/air interface. Surprisingly, this complex can be transferred onto solid carriers by means of the LB process.

The invention therefore also relates to a process for the preparation of electroconductive monolayer or multilayer systems which comprises the steps i) preparation of a monomolecular layer from a compound of the formula I, if appropriate in combination with further amphiphilic compounds which are capable of stabilization of such layers, and ii) transfer of this layer onto a solid carrier by the Langmuir-Blodgett process by dipping and/or removal of said carrier once or several times through the layer, the subphase for the preparation of said monomolecular layer containing an electron acceptor which, with the compound of the formula I, forms a donor-acceptor complex at the water/air interface. Examples of suitable electron acceptors for this process are KI$_3$ solutions.

The invention particularly preferably relates to a process for the preparation of electrically conductive monolayer or multilayer systems which comprises the steps i) preparation of a monomolecular layer from a compound of the formula I, or from a mixture of a compound of the formula I in combination with further amphiphilic compounds which are capable of stabilization of such layers, ii) transfer of this layer onto a solid carrier having an electrically conductive surface by dipping said carrier once or several times through the layer, and iii) electrochemical oxidation of said layer system by dipping said coated carrier into an electrolyte solution into which a counterelectrode also dips, and connecting said carrier as the anode with application of a potential, so that the compound of the formula I is oxidized in said layer system with introduction of counterions from the electrolyte.

In the embodiment of the process, layers having a particularly low flaw density can be produced.

A further advantage of this process is that a large number of different counterions can be introduced into the layer system. Examples of these are inorganic anions, such as $ClO_4^-$, $BF_4^-$, $PF_6^-$, $SbF_6^-$, $SbCl_4^-$, $SbCl_6^-$, $F^-$, $Cl^-$, $Br^-$, $I^-$ or $I_3^-$, or organic anions, such as tetracyanoquinodimethane$^-$, tetracyanoethylene$^-$, alkyl-, aryl-, alkaryl-, aralkyl-, fluoroalkyl- or fluoroalkarylsulfonate, -phosphate or -phosphonate, or heteroarylsulfonates, such as pyrrolopyrroledisulfonate.

By modifying this latter process, layer systems containing an oxidized form of the compounds of the formula I can also be converted back into the reduced starting compound by connecting the layer system dipping into the electrolyte solution as the cathode in step iii) and applying a potential, so that the neutral form is re-formed from the oxidized form of the compound of the formula I. Using this modified process, reversible colour changes in the LB layer system can be achieved.

The invention therefore also relates to a process for reversible electrochemical oxidation and reduction of LB layer systems containing a compound of the formula I which comprises dipping a carrier coated with LB layers containing said compound of the formula I and having an electrically conductive surface into an electrolyte solution into which a counter electrode also dips, and connecting said carrier as the anode or cathode with application of a potential, so that the compound of the formula I is oxidized or the oxidized form of the compound of the formula I is reduced.

The invention furthermore relates to the electrically conductive monolayer- or multilayer-containing donor-acceptor complexes of compounds of the formula I and an electron acceptor.

The monolayer and multilayer systems of compounds of the formula I or the doped systems containing donor-acceptor complexes of these compounds and electron acceptors are distinguished by high stability in air.

The spectra of the undoped and doped forms differ with respect to their $\lambda_{max}$ values and their extinction coefficients.

The monolayer or multilayer systems of compounds of the formula I and the doped systems are thus electroactive materials, i.e. materials which have different physical properties in the oxidized and in the reduced state and which can be switched between the two states by redox processes.

The monolayer or multilayer systems containing compounds of the formula I are suitable for the production of electrically conductive coatings, electrochromic displays, electrodes and sensors.

The invention also relates to the use of these monolayer or multilayer systems for the abovementioned purposes.

The examples below illustrate the invention.

A) PREPARATION EXAMPLES

Example 1

Preparation of 2-n-octyloxy-5,6,11,12-tetrathiotetracene 1.1. Preparation of the end product

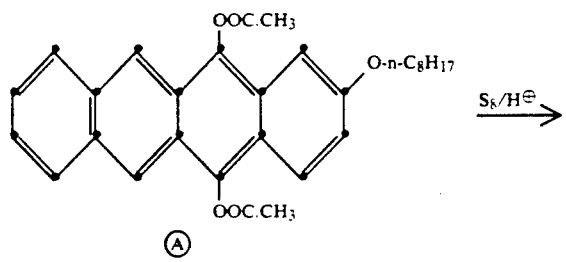

846 mg (1.83 mmol) of diacetate (A), 507 mg (15.8 meq) of $S_8$ and 5 mg (0.026 mmol) of p-toluenesulfonic acid in 100 ml of 1,2,4-trichlorobenzene are refluxed for 5½ hours under a gentle stream of argon in a 250 ml flask fitted with reflux condenser and gas-inlet tube. The dark-green solution is then evaporated in a high vacuum.

The crude product (1.35 g) is chromatographed on a silica gel flash column (240 g of silica gel, ⌀ 7 cm) using $CCl_4$ [The silica gel must previously be treated with $CCl_4/2\%$ of triethylamine and then washed with pure $CCl_4$ until the eluate is again neutral]. The dark green fractions contain the purified 2-n-octyloxy-5,6,11,12-tetrathiotetracene. The yield is 560 mg (65%).

$\lambda_{max}$ (1,2,4-trichlorobenzene) 698, 640, 472 nm;

Mass spectrum $M^+ = 480$ m/e; the fragmentation agrees with the structure.

1.2 Preparation of the diacetate (A) by reductive acetylation of 2-n-octyloxytetracene-5,12-dione

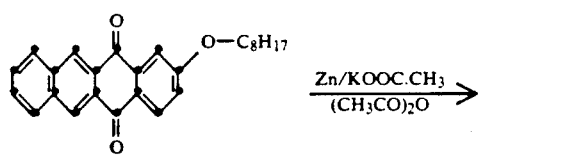

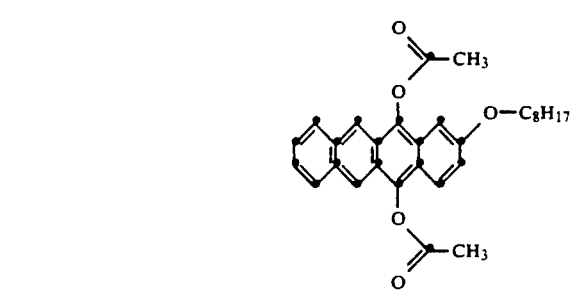

2.0 g (31.05 mmol) of zinc powder are added with stirring to 4 g (10.35 mmol) of 2-n-octyloxytetracene-5,12-dione, 40 ml of ethyl acetate, 25 ml of acetic anhydride and 3.05 g (31.05 mmol) of potassium acetate. The mixture is stirred at 25° for 40 minutes and filtered, and the residue is washed four times with $CH_2Cl_2$. The filtrates are evaporated, and the residue is recrystallized from $CH_2Cl_2$/pentane, then from toluene; yield 4.1 g (84%), m.p. 107°–111°.

1.3. Preparation of 2-n-octyloxytetracene-5,12-dione

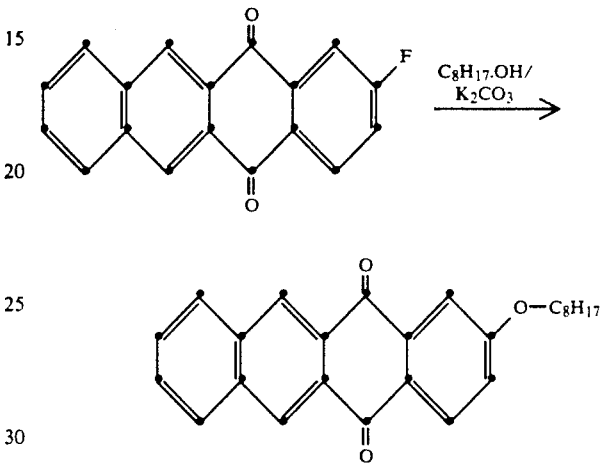

20 g (72.4 mmol) of 2-fluorotetracene-5,12-dione, 94.3 g of 1-octanol, 30.01 g (217.2 mmol) of anhydrous potassium carbonate and 200 ml of DMSO are stirred at 100° for 20 hours. The reaction mixture is cooled, toluene/dilute hydrochloric acid are added, and the organic phase is separated off, washed twice with water, dried using sodium sulfate and evaporated. The residue is washed with pentane and recrystallized from cyclohexane.

Yield: 22.9 g (82%), m.p. 127°–129°.

Elemental analysis for $C_{26}H_{26}O_3$ (MW 386.49)

Calculated: C 80.80 H 6.78 O 12.42%
Found: C 80.68 H 6.89 O 12.57%

Example 2

Preparation of 2-Trifluoromethyl-5,6,11,12-tetrathiotetracene 2.1. Preparation of the end product

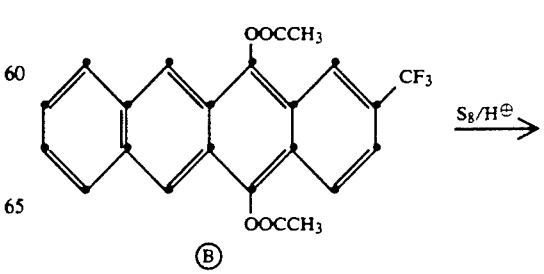

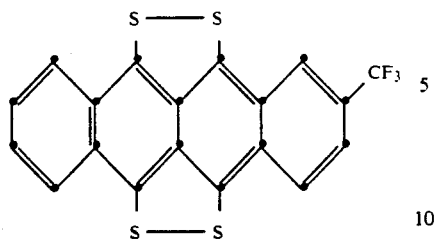

251 mg (0.61 mmol) of diacetate Ⓑ, 78 mg (2.43 meq) of $S_8$ and 2 mg (0.01 mmol) of p-toluenesulfonic acid in 35 ml of 1,2,4-trichlorobenzene are refluxed for 20 hours under a gentle stream of argon in a 100 ml flask fitted with reflux condenser and gas-inlet tube.

After the mixture has been cooled in a high vacuum, the solvent is evaporated, the residue is boiled with hexane, and the black powder is filtered off and dried in a high vacuum at 60°. The yield is 203 mg (79%) of crude product.

The latter is sublimed at 190° C. ($10^{-2}$ Pa), to give 67.5 mg (25.6%) of pure 2-trifluoromethyl-5,6,11,12-tetrathiotetracene (black needles). Mass spectrum: $M^+ = 420$; fragmentation agrees with the expected structure.

$\lambda_{max}$ (1,2,4-trichlorobenzene): 725, 665, 484 nm.

2.2. Preparation of the diacetate Ⓑ by reductive acetylation of 2-trifluoromethyltetracene-5,12-dione The procedure as described under 1.2 is followed, replacing the 2-n-octyloxytetracene-5,12-dione by 2-trifluoromethyltetracene-5,12-dione. After work-up as in Example 1.2, the desired product is obtained in a yield of 91% of theory (melting point: 285°–288° C.).

2.3. Preparation of 2-trifluoromethyltetracene-5,12-dione

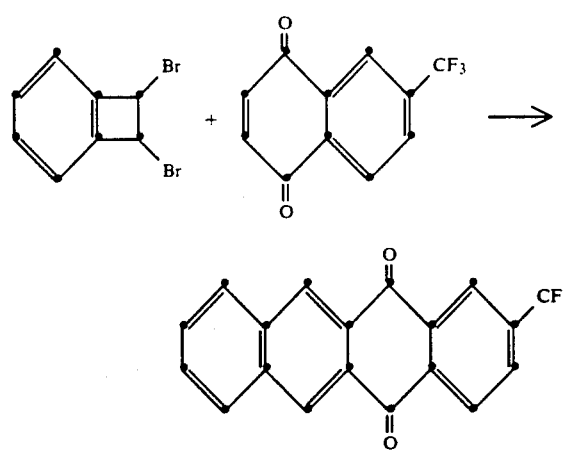

5.65 g (25 mmol) of 6-(trifluoromethyl)-1,4-naphthoquinone, 9.82 g (about 37 mmol) of 1,2-dibromobenzocyclobutene (contaminated with a little 2-bromo-1-iodobenzocyclobutene) and 100 ml of xylene are kept under reflux for 16 hours using a water separator. The mixture is cooled, and the precipitate is filtered off and washed with xylene. The yield is 5.82 g (71%); m.p. 253°–254°.

Elemental analysis for $C_{19}H_9F_3O_2$ (MW 326.27)
Calculated: C 69.95 H 2.78 F 17.47%
Found: C 69.84 H 3.05 F 17.38%

2.4. Preparation of 6-(trifluoromethyl)-1,4-naphthoquinone

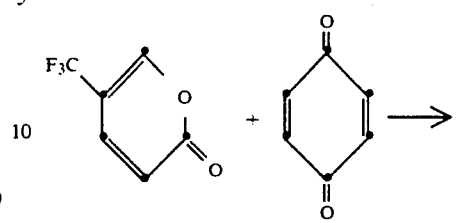

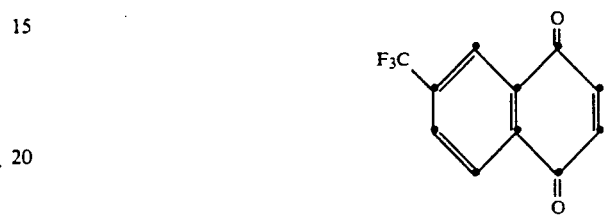

1.64 g (0.01 mol) of 5-trifluoromethyl-2-oxo-2H-pyran and 5.4 g (0.05 mol) of 1,4-benzoquinone in 7 ml of 1,2-dichlorobenzene are heated at 180° C. for 12 hours. The reaction mixture is then evaporated at 90°/20 mbar, and the distillation residue is chromatographed on 150 g of silica gel 60 (eluent $CH_2Cl_2$: acetone 19:1; excess pressure of 0.3 bar), yield 1.82 g (80.53%); m.p. 80°–85°.

Example 3

Preparation of 2-n-octadecyloxy-5,6,11,12-tetrathiotetracene

The procedure is analogous to Example 1, and 2-fluorotetracene-5,12-dione is reacted with 1-octadecanol, the 2-n-octadecyloxytetracene-5,12-dione obtained is converted into the corresponding diacetate by reductive acetylation, and the latter is reacted with sulfur in the presence of p-toluenesulfonic acid to form 2-n-octadecyloxytetracene-5,6,11,12-tetrathiotetracene. The individual reaction products have the following characteristic data:

2-n-Octadecyloxytetracene-5,12-dione:
Mass spectrum $M^+ = 526$;
m.p. 85°–90° C.;
$\lambda_{max}$ (chloroform): 410 (sh), 390, 316 (sh), 296, 286 (sh) (nm);

| Analysis. | % C | % H | % O |
|---|---|---|---|
| Calculated for $C_{36}H_{46}O_3$: | 82.09 | 8.80 | 9.11 |
| Found: | 82.26 | 8.81 | 8.97 |

2-n-Octadecyloxy-5,12-bis(acetoxy)tetracene:
Mass spectrum $M^+ = 612$;
m.p. 155°–157° C.;

| Analysis: | % C | % H | % O |
|---|---|---|---|
| Calculated for $C_{40}H_{52}O_5$: | 78.39 | 8.55 | 13.05 |
| Found: | 78.30 | 8.59 | 13.01 |

2-n-Octadecyloxy-5,6,11,12-tetrathiotetracene:
Mass spectrum $M^+ = 620$; the fragmentation agrees with the expected structure;

$\lambda_{max}$ (1,2,4-trichlorobenzene): 699, 644, 472 (nm).

B. USE EXAMPLES

The following substances are used in the use examples:

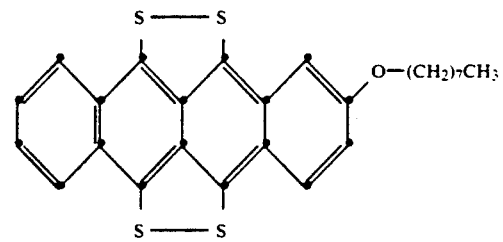  1

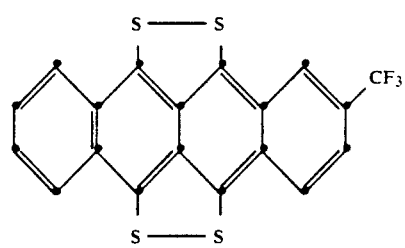  2

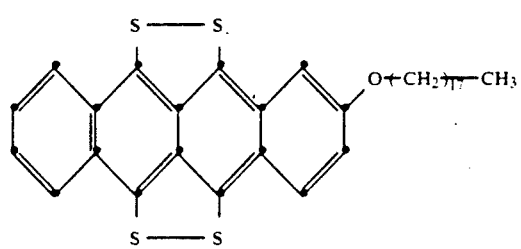  3

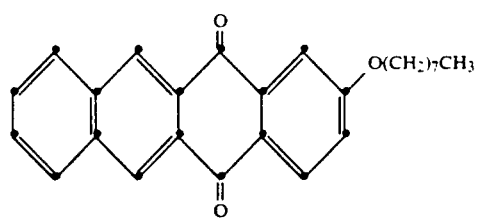  5

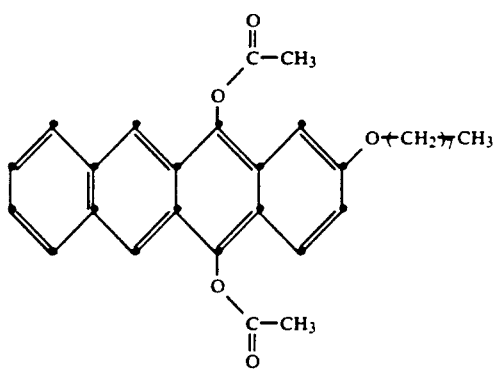  6

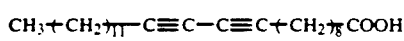  8

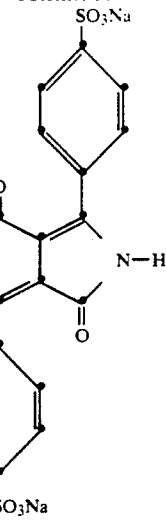  9

The preparation of this compound is described in EP-A-224.445.

Example I

A solution of 2-n-octyloxy-5,6,11,12-tetrathiotetracene 1 in chloroform is prepared (0.5 mg/ml). This solution is spread at constant temperature on the water surface of a Langmuir trough. A commercial Langmuir trough (MGW Lauda) is used (size 70×15×0.6 cm; preparative version). The subphase used is generally demineralized water which has been further purified using a Milli-Q unit (Millipore Corp.) (specific resistance $\rho > 18$ M$\Omega$.cm). If necessary, a $3 \times 10^{-4}$M CdCl$_2$ solution (Merck, purum) adjusted to about pH 6.8 using NaHCO$_3$ (Merck, p.a.) is also used. The solvents used are of spectroscopic quality. After spreading, a monomolecular film forms which is compressed at a rate of 1.25 cm/min., the film pressure (shear) $\pi$ [mN/m] being recorded as a function of the area per molecule A [nm$^2$/molecule] (shear-area isotherms). Monolayers are obtained, and their properties are listed in Table 1.

Example II

The procedure is as in Example I. 1 is replaced by 2-trifluoromethyl-5,6,11,12-tetrathiotetracene 2. The properties of the monolayers obtained are shown in Table 1.

Example III

The procedure is as in Example I. 1 is replaced by 2-n-octadecyloxy-5,6,11,12-tetrathiotetracene 3. The properties of the monolayers obtained are shown in Table 1.

TABLE 1

| Compound | T [°C.] | $\pi_{COLLAPSE}$ [mN/m] | $A_{COLLAPSE}$ [nm$^2$/molecule] |
|---|---|---|---|
| 1 | 15 | 47 | 0.32 |
| 2 | 20.7 | 44 | 0.28 |
| 3 | 15 | 50 | 0.26 |

Example IV

A solution, prepared in accordance with Example I, of 2-n-octyloxy-5,6,11,12-tetrathiotetracene 1 is mixed with a solution of methyl arachidate 4 (Fluka, puriss.) in chloroform (1 mg/ml) in a manner such that mixed solutions of different composition are produced (see Table 2). These solutions are spread on the water surface of a Langmuir trough (as in Example I). The monomolecular films formed are compressed at a rate of 1.25 cm/min, and the shear-area isotherms are recorded analogously to Example I. The characteristic data of these monolayers are collated in Table 2.

TABLE 2

| 1 + 4 [mol %] | T [°C.] | $\pi_{COLLAPSE}$ [mN/m] | $A_{COLLAPSE}$ [nm$^2$/molecule] |
| --- | --- | --- | --- |
| 100:0 | 15.5 | 47 | 0.32 |
| 90:10 | 15.5 | 42 | 0.36 |
| 80:20 | 15.5 | 42 | 0.34 |
| 70:30 | 15.5 | 47 | 0.29 |
| 0:100 | 15.5 | 51 | 0.21 |

Example V

The procedure is as in Example IV. Methyl arachidate 4 is replaced by 2-n-octyloxytetracene-5,12-dione 5 (0.64 mg/ml of chloroform). The characteristic data of the monolayers are shown in Table 3.

TABLE 3

| 1 + 5 [mol %] | T [°C.] | $\pi_{COLLAPSE}$ [mN/m] | $A_{COLLAPSE}$ [nm$^2$/molecule] |
| --- | --- | --- | --- |
| 100:0 | 15 | 45 | 0.33 |
| 90:10 | 15 | 44 | 0.31 |
| 80:20 | 15 | 43 | 0.33 |
| 70:30 | 15 | 40 | 0.33 |
| 60:40 | 15 | 40 | 0.32 |
| 50:50 | 15 | 39 | 0.31 |
| 0:100 | 15 | 37 | 0.31 |

Example VI

The procedure is as in Example IV. Methyl arachidate 4 is replaced by 5,12-bisacetoxy-2-octyloxytetracene 6 dissolved in chloroform (about 0.4 mg/ml), and a mixed solution of 1 and 6 in the ratio 70:30 (mol %) is prepared.

At the point of collapse, the film has a film pressure $\pi = 47$ mN/m and an area A=0.28 nm$^2$/molecule.

Example VII

As described in Example IV, a mixed solution of 2-n-octyloxy-5,6,11,12-tetrathiotetracene 1 and methyl arachidate 4 in the ratio 70:30 (mol %) is prepared and spread on the water surface of a Langmuir trough (as in Example I). The monomolecular film formed is compressed at a rate of 1.25 cm/min., until a film pressure of 20 mN/m has been reached. At constant pressure, the point when no decrease in the surface area is observed is awaited. The film is subsequently transferred by the Langmuir-Blodgett technique onto quartz plates[1] (12×25 mm) which have been rendered hydrophobic. An FL-I Filmlift (MGW-Lauda) is used to transfer the monolayers.

[1] The quartz plates are cleaned first in a hot solution of K$_2$S$_2$O$_8$ (Fluka, puriss.) in H$_2$SO$_4$ (Merck, p.a., 95-97%) and subsequently in 10$^{-3}$M NaOH (Merck, p.a.) and rinsed well with Millipore water. They are then rendered hydrophobic either by silylation (treatment with octadecyltrichlorosilane (Merck, 98%)) or by pre-coating with three layers of Cd arachidate (Fluka, puriss.).

The transfer rate of the monolayers is 2-3 cm/min. The multilayers obtained have a Y orientation and are blue-green in colour. 20-60 layers are applied. X-ray diffraction studies show a double-layer separation d$_{001}$ of 4.22 nm.

Example VIII

The procedure is as in Example VII. Methyl arachidate 4 is replaced by 5,12-bisacetoxy-2-octyloxytetracene 6 (0.4 mg/ml of chloroform). 20-60 monolayers are applied. The multilayer has absorption maxima at 640, 685 and 760 nm.

Example IX

The procedure is as in Example VII. Methyl arachidate 4 is replaced by arachidic acid 7 (Fluka, puriss.). The subphase used is a 3×10$^{-4}$M CdCl$_2$ solution (pH 6.8). 20-60 layers are applied. The multilayer has absorption maxima at 620, 670 and 750 nm.

Example X

The procedure is as in Example VII. Methyl arachidate 4 is replaced by pentacosa-10,12-diynoic acid 8. The subphase used is a 3×10$^{-4}$M CdCl$_2$ solution (pH 6.8). 20-60 monolayers are transferred. The multilayer has absorption maxima at 570, 624, 676 and 750 nm. On irradiation with UV light ($\lambda = 254$ nm), additional bands appear between 500 and 700 nm.

Example XI

The procedure is as in Example VII. 1 is replaced by 2-trifluoromethyl-5,6,11,12-tetrathiotetracene 2. 20-60 monolayers are applied. The multilayer has absorption maxima at 714 and at 770 nm.

Example XII

For conductivity measurements in the layer plane, multilayers are prepared in accordance with Example VII (30 layers). Gold electrodes are vapor-deposited on the uppermost layer in vacuo (10$^{-1}$–10$^{-3}$ Pa) by means of a mask. These electrodes are provided with contacts by means of gold wire and Pt paste. For doping, the samples are exposed to an iodine-saturated argon atmosphere. During the iodine treatment, the colour of the multilayers changes from blue-green to brown-violet (with a metallic lustre when observed in reflection). The electrical conductivity $\sigma$ is determined using an electometer (Keithley) before and after doping. The characteristic data before and after doping are shown in Table 4.

Example XIII

Multilayers are prepared as in Example VIII (30 layers). The samples are provided with contacts and subsequently doped with iodine as described in Example XII, with the change in conductivity being determined. During the iodine treatment, the colour of the multilayer changes from blue-green to brown-violet (with a metallic lustre when observed in reflection). The characteristic data before and after doping are shown in Table 4.

Example XIV

Multilayers are prepared as in Example VII (30 layers). They are provided with contacts as described in Example XII. For doping, the samples are subsequently exposed to an argon stream containing 0.1% v/v of chlorine, with the conductivity being determined at the same time. During the chlorine treatment, the colour of the multilayers changes from blue-green to blue-violet and finally red-orange. The characteristic data of the multilayers before and after doping are shown in Table 4.

Example XV

Multilayers are prepared as in Example XI (30 layers). They are provided with contacts and doped with iodine as described in Example XII, with the change in conductivity being determined. During the iodine treatment, the multilayers change their colour from blue-green to brown-violet (with a metallic lustre when observed in reflection). The characteristic data before and after doping are collated in Table 4.

TABLE 4

| Example | Samples (mol %) doping | Conductivity $\sigma$ [S cm$^{-1}$] undoped | doped | $\lambda_{max}$ [nm] undoped | doped |
|---|---|---|---|---|---|
| XII | 1:4 (70:30) iodine-doped | $1.98 \cdot 10^{-8}$ | $1.23 \cdot 10^{-3*}$ | 640, 685, 760 | 440, 550 |
| XIII | 1:6 (70:30) iodine-doped | $6.0 \cdot 10^{-6}$ | $4.2 \cdot 10^{-4*}$ | 640, 683, 760 | 402, 550 |
| XIV | 1:4 (70:30) chlorine-doped | $1.39 \cdot 10^{-7}$ | $1.51 \cdot 10^{-4*}$ | 640, 685, 760 | 530 |
| XV | 2:4 (70:30) iodine-doped | $7.7 \cdot 10^{-7}$ | $1.24 \cdot 10^{-4*}$ | 714, 770 | 438 |

*Maximum values, $\sigma$ decreases again in air or on very long halogen treatment.

Example XVI

Mixed multilayers of 1 are prepared in accordance with Example VII. As the subphase, solutions of KI$_3$ (ICN Biomedicals Inc.) in water with various concentrations (cf. Table 5) are used. 10-60 monolayers are transferred. The monolayers are violet (when the KI$_3$ concentration is greater than $2.5 \times 10^{-4}$M) and have a metallic lustre when observed in reflection. The spectroscopic data of these multilayers are listed in Table 5.

TABLE 5

| [KI$_3$] in mol/l | $\lambda_{max}$ [nm] | $\epsilon$ [cm$^{-1}$] |
|---|---|---|
| $4.55 \cdot 10^{-3}$ | 224 (sh), 304 (sh), | 556 (103, 690) |
| $2.28 \cdot 10^{-3}$ | 224 (sh), 305 (sh), | 560 (82, 060) |
| $1.14 \cdot 10^{-3}$ | 226 (sh), 306 (sh), | 560 (73, 460) |
| $5.70 \cdot 10^{-4}$ | 232 (sh), 308 (sh), | 563 (73, 460) |
| $2.85 \cdot 10^{-4}$ | 230 (sh), 306 (sh), | 570 (41, 770) |
| $1.43 \cdot 10^{-4}$ | 230 (sh), 308 (sh), | 576 (26, 780) |

Example XVII

Mixed multilayers of 1 are prepared in accordance with Example VII. The subphase used is a $10^{-3}$M KI$_3$ solution. 30 layers are applied. The multilayer is violet. It is provided with contacts using gold electrodes as described in Example XII, and the conductivity is subsequently measured. The sample is then exposed to a saturated iodine/argon atmosphere, during which the colour of the multilayer changes from violet to brown and the conductivity increases. The conductivity data and the spectroscopic data of these multilayers can be found in Table 6.

TABLE 6

| Doping | $\sigma$ [S cm$^{-1}$] | $\lambda_{max}$ [nm] |
|---|---|---|
| KI$_3$ subphase | $2.7 \cdot 10^{-4}$ $4.45 \cdot 10^{-5*}$ | 554 |
| Additionally treated with I$_2$/Ar | $1.0 \cdot 10^{-2}$ $3.75 \cdot 10^{-4*}$ | 423, 500 |

*After storage in air at +5° C. for 82 days.

Example XVIII

Multilayers are prepared as in Example VII, with 30 monolayers being applied. The samples are subsequently dipped into a $5.3 \times 10^{-4}$M aqueous KI$_3$ solution for 15 hours, during which the colour of the multilayers changes from blue-green to orange-brown (UV/VIS absorptions at 402, 480 and 560 nm).

The multilayers are provided with contacts using gold electrodes as described in Example XII, and the electrical conductivity $\sigma$ in the layer plane is then measured using an electrometer (Keithley). The samples are subsequently exposed to an iodine-saturated argon atmosphere, and the conductivity is re-determined.

| $\sigma$ (KI$_3$): | $1.52 \times 10^{-4}$ S cm$^{-1}$ |
|---|---|
| $\sigma$ (KI$_3$ + I$_2$): | $4.79 \times 10^{-3}$ S cm$^{-1}$ |

Example XIX

Preparation of a mixed LB multilayer from 2-n-octyloxy-5,6,11,12-tetrathiotetracene 1 and methyl arachidate 4

A solution of 1 in chloroform is prepared (about 0.5 mg/ml) and mixed with a solution of methyl acrachidate 4 in chloroform (about 1 mg/ml), to give a mixed solution 1:4 of 70:30 (mol %). This solution is spread at constant temperature (T=15° C.) on the water surface of a Langmuir trough analogously to Example I. After spreading, a monomolecular film forms, and is compressed at a rate of about 1.25 cm/min., until a film pressure of $\pi=20$ mN/m has been reached.

At constant pressure, the point at which no further decrease in area is observed is awaited. The film is subsequently transferred onto ITO glass plates[2] by the Langmuir-Blodgett technique. An FL-1 Filmlift (MGW-Lauda) is used to transfer the monolayer, and the dipping rate is 2-3 cm/min. The multilayer applied has a thickness of 15 layers and a Y orientation and is blue-green. The characteristic data are listed in Table 7.

[2] Glass plates coated on one side with indium/tin oxide (ITO); manufacturer: Balzers, Liechtenstein; for cleaning, the ITO glass plates (11×18×1 cm) are treated with ultrasound in chloroform. During this treatment, the solvent must not warm significantly since the ITO layer is otherwise destroyed.

Example XX

Electrochemical oxidation and reduction of the LB multilayer of 1 and methyl arachidate 4 using LiClO$_4$ as conductive salt A multilayer prepared as in Example XIX is dipped into a $10^{-3}$ molar solution of LiClO$_4$ (Fluka, purum) in "Millipore water" and subjected to electrolysis. The multilayer is connected as the anode, and the counter-electrode used is a gold wire, likewise dipping into the solution. The distance between the gold wire and the multilayer is about 2 cm. The direct current source used is a mains unit from Kikusui (model PAB 18-1A). On application of a voltage (0.1 to 2.0 V), a current flows and the donor molecules 1 in the multilayer are oxidized. The oxidation can be monitored spectrometrically (Table 7)[3]. The violet free-radical cation ($\lambda_{max}=576$ nm) forms at low voltage (0.1 to 0.4 V), and the dication with an absorption maximum at 425 nm forms at higher voltage (>0.4 V). If the polarity is reversed when oxidation is complete, the UV/VIS spectrum of the neutral TTT molecules is obtained again.[3]

[3] The multilayer on the non-conductive rear of the substrate is removed before the spectroscopic measurement.

Example XXI

Electrochemical oxidation and reduction of the LB multilayer of 1 and methyl arachidate 4 using sodium dodecylsulfate as conductive salt A multilayer prepared as in Example XIX is oxidized electrochemically as described in Example XX. The procedure is modified by replacing the LiClO$_4$ solution by a $10^{-3}$ molar solution of sodium dodeclysulfate (Merck, "for biochemical purposes and surfactant studies") in "Millipore water" (pH=5.95). The UV/VIS spectroscopic data of the electrochemically treated multilayers are listed in Table 7. The multilayer on the nonconductive rear was removed before the spectroscopic measurement. The spectroscopic data show that 1 is electrochemically oxidized or reduced.

Example XXII

Electrochemical oxidation of the LB multilayer of 1 and methyl arachidate 4 using disodium diketopyrrolopyrroledisulfonate (DPP disulfonate) 9 as conductive salt A multilayer prepared as in Example XIX is electrochemically oxidized as described in Example XX. The procedure is modified by replacing the LiClO$_4$ solution by a $10^{-4}$ molar solution of DPP disulfonate 9 in "Millipore water" (pH=5.85). The UV/VIS spectroscopic data of the electrochemically treated multilayers are listed in Table 7. The multilayer on the non-conductive rear of the substrate was removed before the spectroscopic measurement. The spectroscopic data show that 1 is electrochemically oxidized.

Example XXIII

Cyclic voltammetry on LB multilayers of 1 and methyl arachidate 4

A LB film prepared as in Example XIX is dipped into a 0.1 molar sodium dodecylsulfate solution and subjected to cyclic voltammetry. The sodium dodecylsulfate (SDS) solution is prepared by dissolving SDS which has been recrystallized from 95% ethanol in tridistilled, nitrogen-saturated water. The cyclic voltammetry is carried out using an instrument from PAR (model 273). The reference electrode used is an Ag/Ag$^+$ electrode dipping into the SDS solution. The oxidation of the multilayer to the free-radical cation stage of 1 is carried out at a potential of $-238$ mV and to the dication stage at $+173$ mV. Oxidation and reduction are reversible many times. After 120 cycles, ⅓ of the original peak current for the oxidation to the free-radical cation can still be measured. The maximum peak current is reached after a conditioning phase of 10 cycles.

Example XXIV

Electrochemical reduction and oxidation of an iodine-doped multilayer of 1 and methyl arachidate 4

A LB multilayer is prepared in accordance with Example XIX with a layer thickness of 33 monolayers. The LB multilayer is exposed to an iodine-saturated argon atmosphere for 2 hours, during which oxidation of 1 to the dication stage takes place. The multilayer is subsequently, as described in Example XX, electrochemically reduced, re-oxidized and reduced. This is achieved by connecting the ITO-coated glass plate in each case as the cathode, then as the anode and again as the cathode. The voltage is 2 V in each case. In order to detect the oxidation or reduction which has occurred, the multilayer is wiped off the non-conductive rear of the substrate, and the multilayer is measured on the ITO side by UV/VIS spectroscopy. The data are listed in Table 8. They show that the sample which has been chemically doped with iodine can be electrochemically reduced, re-oxidized and reduced.

Table 7

Characteristic data of multilayers of 1 and methyl arachidate 4 in neutral and electrochemically oxidized form, prepared as in Examples XIX to XXII

| Multilayer from Example | Voltage [V] | Number of layer applied | d$_{001}$ values* [nm] | $\lambda_{max}$** [nm] | $\epsilon$*** [cm$^{-1}$] |
|---|---|---|---|---|---|
| XIX | — | 15 | | 750 sh | |
| | | | | 670 | (9,300) |
| XX | 0.2 | 15 | | 570 | (10,600) |
| XX | 0.5 | 51 | 4.17 | 570 | (9,300) |
| XX | 0.8 | 15 | | ~560 | (6,100) |
| | | | | 420 | (10,900) |
| XX | 1.0 | 15 | | ~560 | (6,400) |
| | | | | 420 | (15,100) |
| XX | 1.5 | 51 | 4.16 | ~560 | (5,800) |
| | | | | 420 | (14,700) |
| XX | 2.0 | 15 | | ~560 | (5,400) |
| | | | | 420 | (14,100) |
| XXI | 1.5 | 31 | | 470 | (30,100) |
| XXI | −1.5 | 31 | | 560 | (10,100) |
| XXII | 1.5 | 31 | | 570 | (9,000) |

*Double-layer separation determined X-ray studies by means of a Philips powder diffractometer. In general, 3 orders of reflections were observed.
**The absorption bands are often very broad, which means that exact allocation of the maxima to wavelengths is difficult
***The $\epsilon$ values were calculated for all samples on the basis of an assumed d$_{001}$ value of 4.16 nm.

TABLE 8

UV/VIS spectroscopic data of the multilayers from Example XXIV

| Sample treatment | $\lambda_{max}$ [nm] | $\epsilon$ [cm$^{-1}$] |
|---|---|---|
| Undoped | 750 sh | |
| | 660 | (12,200) |
| Iodine-doped | 550 | (47,400) |
| | 460 sh | |
| Electrochemically reduced | 750 sh | |
| | 660 | (9,500) |
| Electrochemically oxidized | 550 | (16,000) |
| | 460 | (19,200) |

What is claimed is:
1. A monolayer or multilayer system containing compounds of the formula I

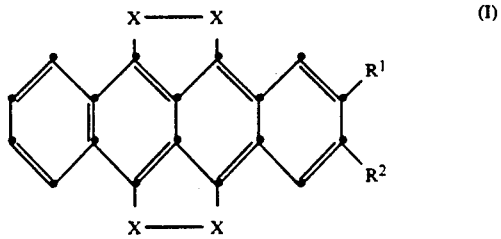

in which X is S or Se, $R^1$ is $C_1$-$C_{30}$alkyl, —$CF_3$, —O—$R^3$, —S—$R^3$ or —CO—O—$R^3$, $R^2$ is hydrogen, $C_1$-$C_{30}$alkyl, —$CF_3$, —O—$R^3$, —S—$R^3$ or —CO—O—$R^3$, and $R^3$ is $C_1$-$C_{30}$alkyl or partially or perfluorinated $C_1$-$C_{30}$alkyl.

2. A system according to claim 1, which system is a monomolecular layer or sequences of monomolecular layers containing compounds of the formula I obtainable by transfer onto solid carriers by the Langmuir-Blodgett process (LB process).

3. A system according to claim 1 in which X is S.

4. A system according to claim 3, in which $R^1$ is —O—$R^3$ and $R^2$ is hydrogen.

5. A system according to claim 3, in which $R^1$ is —$CF_3$ and $R^2$ is hydrogen.

6. A system according to claim 1, in which $R^3$ is $C_3$-$C_{18}$alkyl.

7. A system according to claim 2 comprising mixed films containing 1-95 mol % of compounds of the formula I in combination with further amphiphilic compounds which are capable of stabilization of monomolecular films.

8. A system according to claim 2 comprising mixed layers of compounds of the formula I and salts of long-chain saturated carboxylic acids, salts of long-chain unsaturated acids, methyl esters of these acids or compounds of the formula XIII or XIV

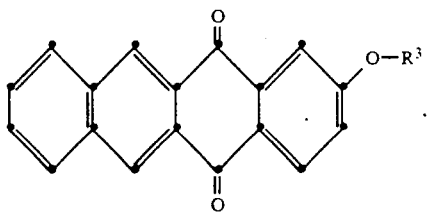
(XIII)

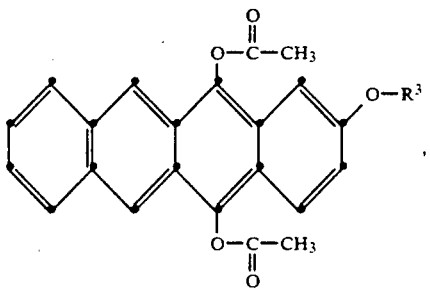
(XIV)

in which $R^3$ has the meaning defined in claim 1.

* * * * *